Oct. 18, 1938.　　　　F. HERGE　　　　2,133,512

POWER DRIVEN LAWN MOWER

Filed Aug. 10, 1936　　　2 Sheets-Sheet 1

Frank Herge
INVENTOR

BY Victor J. Evans & Co.
ATTORNEYS

Oct. 18, 1938.  F. HERGE  2,133,512
POWER DRIVEN LAWN MOWER
Filed Aug. 10, 1936  2 Sheets-Sheet 2
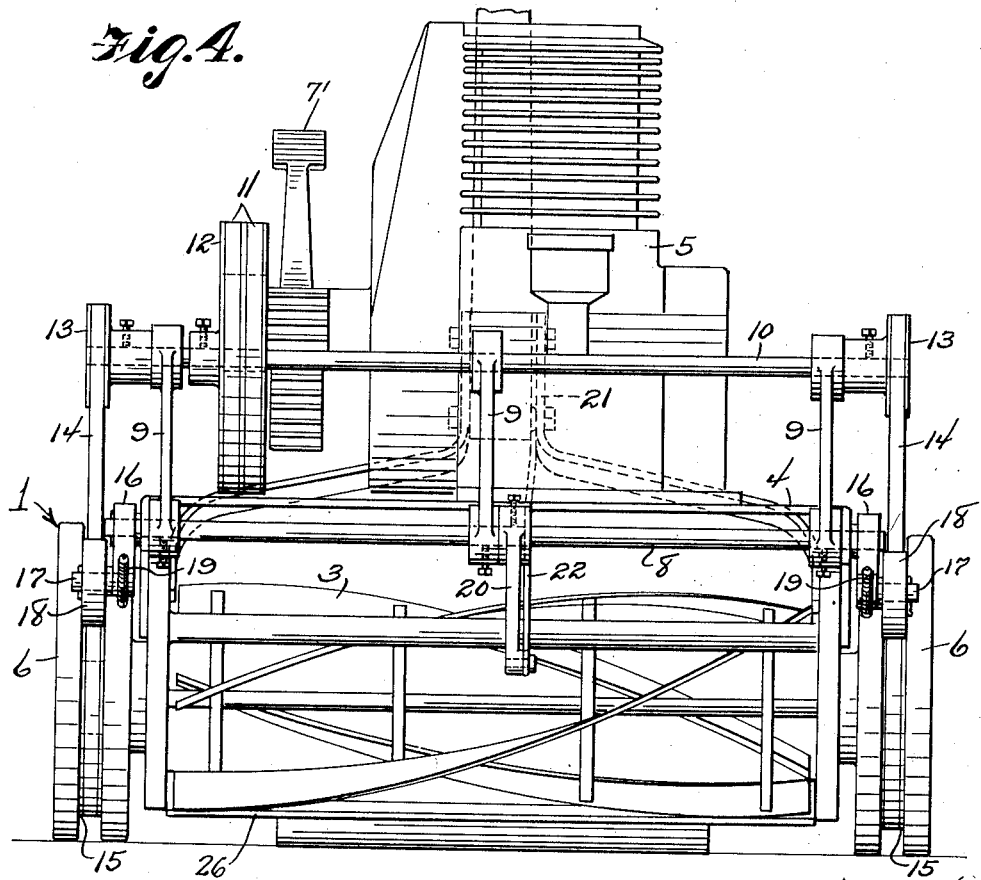
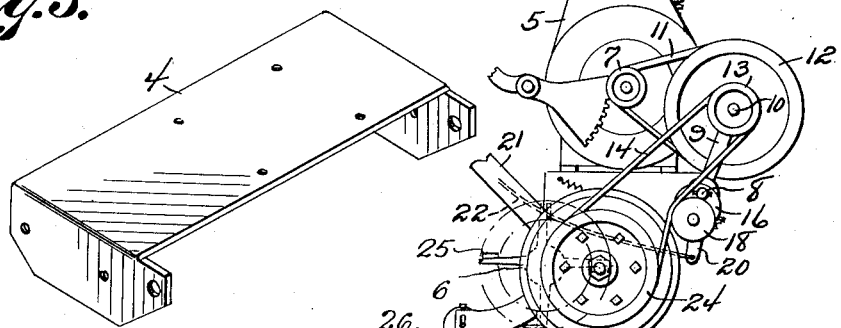
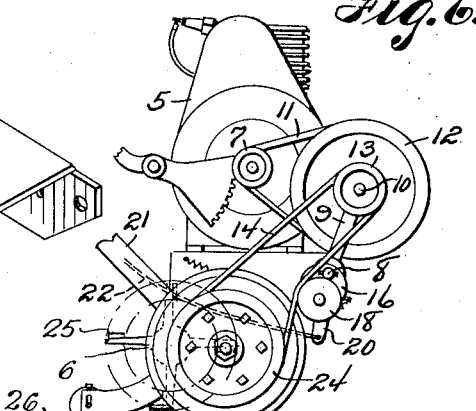
Frank Herge
INVENTOR
BY Victor J. Evans & Co.
ATTORNEYS Patented Oct. 18, 1938

2,133,512

UNITED STATES PATENT OFFICE 2,133,512

POWER DRIVEN LAWN MOWER

Frank Herge, Malinta, Ohio

Application August 10, 1936, Serial No. 95,266

3 Claims. (Cl. 56—26)

This invention relates to power driven lawn mowers and more particularly to a device for adapting a prime mover to a lawn mower of a conventional construction and has for the primary object the provision of a simple, efficient and inexpensive means for delivering power from the prime mover to the lawn mower for propulsion of the latter and which is controlled by the different positions of the lawn mower handle so that the lawn mower may be stopped and started as desired.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a side elevation illustrating a lawn mower equipped with my invention so that a prime mover may be readily adapted to the lawn mower for the propulsion of the latter.

Figure 4 is a front elevation illustrating the lawn mower and prime mover equipped with my invention.

Figure 5 is a perspective view illustrating a platform.

Figure 6 is a fragmentary side elevation illustrating a modified form of my invention.

Figure 1:
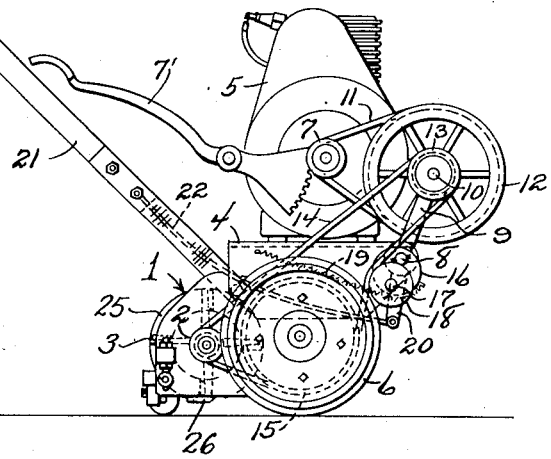

Referring in detail to the drawings, the numeral 1 indicates a conventional type of lawn mower and to convert a lawn mower so that it may be power driven, belt pulleys 2 are secured to the rotating cutting blade 3 and a platform 4 forming a part of the present invention is suitably secured to the frame of the lawn mower so as to support a prime mover 5 directly over the wheels 6 of the lawn mower. The prime mover 5 can be bought upon the market and forms no part of the present invention and is provided with a belt pulley 7 on its power take-off shaft. A cranking lever 7' is provided on the prime mover for starting the latter.

A shaft 8 is journaled to the platform 4 and has secured thereto arms 9 which rotatably support a driven shaft, 10. The driven shaft is connected to the prime mover by endless belts 11, belt pulleys 12 being provided for the belts 11 and secured to the shaft 10. The belts 11 also pass over the pulleys 7 of the prime mover 5.

Belt pulleys 13 are secured to the shaft 10 and have trained thereover endless belts 14. The endless belts are trained over the pulleys 2 and also pulleys 15 secured to the wheels 6 of the lawn mower by means of bolts 15' or the like.

Arms 16 are journaled to the shaft 8 and have secured thereto stub shafts 17 on which idler pulleys 18 are journaled. The idler pulleys 18 engage runs of the endless belts 14. Coiled springs 19 are secured to the arms 16 and to the platform 4 acting to urge the idler pulleys into engagement with the runs of the belt 14 and thereby keep the belts 14 tight on the pulleys 13, 2 and 15 to prevent slippage.

An arm 20 is secured to the shaft 8 and is connected to the handle 21 of the lawn mower by a rod 22. A rotary reel of the conventional type is indicated at 25 and a conventional type stationary blade is shown at 26.

Figure 2:
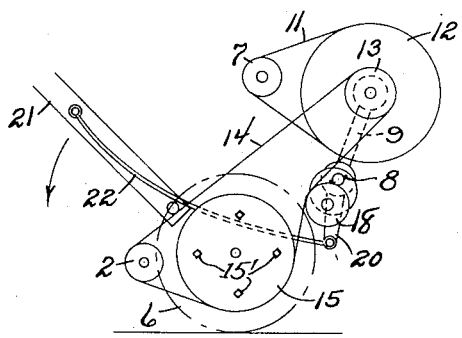
Figure 2 is a diagrammatical view showing the device adjusted so that power will be delivered from the prime mover to the lawn mower.

In the operation of this form of the device, when the handle 21 is swung downwardly to its operative position for the control or guidance of the lawn mower, as shown in Figure 2 of the drawings, the rod 22 is pulled to the left which in turn moves the arm 20 to the left, whereby, since the shaft 8 has the arm 20 fixed thereto, the shaft 8 has imparted thereto a clockwise movement. Inasmuch as the arms 9 are secured to the shaft 8, the clockwise movement of the shaft 8 causes a similar movement of the arms 9 which in turn swings the shaft 10 away from the prime mover and the idler pulleys 18. In this movement the shaft 10 carries the pulleys 12 and 13 therewith, thereby effecting a tightening of the belts 11 and 14 and connecting the drive shaft of the prime mover to the rotatable cutting blade 3 and to the wheels 6 of the mower by means of the pulleys 15 which are fixed to the wheels 6 by the bolts 15'.

Figure 3:
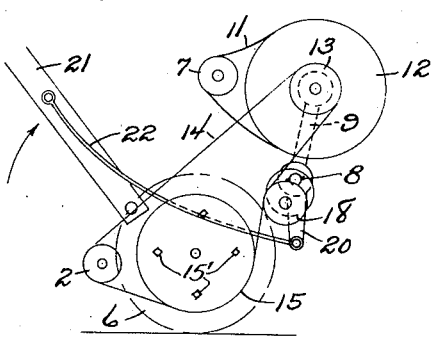
Figure 3 is a view similar to Figure 2 showing the device adjusted to interrupt power from the prime mover to the lawn mower.

When the handle 22 is swung upwardly the movement of the parts is opposite to that described above and, as shown in Figure 3, the belts 11 and 14 become slack thereby disconnecting the prime mover from the wheels and the rotatable cutting blade.

In some lawn mower constructions the rotary cutter is driven by the ground wheels and to adapt the present invention to a lawn mower of this character the pulleys 2 are eliminated and pulleys 24 are secured to the wheels of the lawn mower and have the belts 14 trained thereover. Thus it will be seen that with my form of drive a conventional type of prime mover can be easily mounted on and connected with a conventional type of lawn mower so that the power derived from the prime mover can be utilized for the propulsion of the lawn mower and the power can be interrupted to the lawn mower by changing the position of the handle of the lawn mower.

Having described the invention, I claim:

1. In combination with a lawn mower including a rotatable cutter reel having pulleys thereon, a stationary cutter blade, ground wheels having pulleys thereon, a movably mounted handle and a prime mover having a pulley, a platform mounted on the lawn mower and supporting the prime mover, a shaft journaled on said platform, arms secured to said shaft, a driven shaft carried by said arms, a pulley fastened to said driven shaft, a belt trained over said pulleys, a second pulley fixed to said driven shaft, arms journaled on said first shaft, stub shafts secured to said arms, idler pulleys on said stub shafts, belts trained over said second pulley on the driven shaft, the pulleys on the cutter reel and the pulleys on the wheels, spring means secured to the arms journaled on the first shaft and the platform for urging the idler pulleys into engagement with the last named belts, an arm fixed to said first shaft, and a rod connected to said arm and to said movable handle.

2. In combination with a lawn mower including a rotatable cutter reel, a stationary cutter blade, ground wheels having pulleys thereon, a movably mounted handle and a prime mover having a pulley, a platform mounted on the lawn mower and supporting the prime mover, a shaft journaled on said platform, arms secured to said shaft, a driven shaft carried by said arms, a pulley fastened to said driven shaft, a belt trained over said pulleys, a second pulley fixed to said driven shaft, arms journaled on said first shaft, stub shafts secured to said arms, idler pulleys on said stub shafts, belts trained over said second pulley on the driven shaft and the pulleys on the wheels, spring means secured to the arms journaled on the first shaft and the platform for urging the idler pulleys into engagement with the last named belts, an arm fixed to said first shaft, and a rod connected to said arm and to said movable handle.

3. In combination with a lawn mower including a movable mounted handle and ground wheels and a rotatable cutter reel and a stationary cutter blade cooperating with said reel, a platform secured to the lawn mower, a prime mover supported by the platform, a shaft journaled to the platform, arms secured to said shaft, a driven shaft journaled on said arms, a pulley secured to said driven shaft, a belt connecting the pulley to the prime mover, an extension arm secured to the first-named shaft, a belt connecting the driven shaft and ground wheels, and a spring actuated belt tightening mechanism carried by the first-named shaft and engaging the last-named belt, and means including a rod connecting the extension arm to the handle, whereby movement of the handle to operative position imparts swinging movement to the driven shaft for moving the pulley away from the prime mover and from the spring actuated belt tightening mechanism for tightening the belts and movement of the handle to inoperative position moves the pulley towards the prime mover and the belt tightening mechanism for loosening the belts.

FRANK HERGE.